United States Patent
Yamagishi

Patent Number: 6,125,273
Date of Patent: Sep. 26, 2000

[54] APPARATUS AND METHOD FOR OPERATING A CELLULAR OR PORTABLE TELEPHONE

[75] Inventor: Harumi Yamagishi, San Diego, Calif.

[73] Assignees: Sony Corporation, Tokyo, Japan; Sony Electronics, Inc., Park Ridge, N.J.

[21] Appl. No.: 09/057,391

[22] Filed: Apr. 8, 1998

[51] Int. Cl.[7] .................................................. H04Q 7/22
[52] U.S. Cl. .......................................... 455/411; 455/413
[58] Field of Search ................................... 455/411, 418, 455/419, 550

[56] References Cited

U.S. PATENT DOCUMENTS

| | | | |
|---|---|---|---|
| 5,301,223 | 4/1994 | Amadon et al. | 455/409 |
| 5,485,505 | 1/1996 | Norman et al. | 455/551 |
| 5,878,339 | 3/1999 | Zicker et al. | 455/419 |
| 5,887,250 | 3/1999 | Shah | 455/411 |

*Primary Examiner*—Daniel S. Hunter
*Assistant Examiner*—Myron K. Wyche
*Attorney, Agent, or Firm*—Frommer Lawrence & Haug, LLP; William S. Frommer

[57] ABSTRACT

A technique for activating a cellular or portable telephone includes a circuit for transmitting and receiving signals, a controller for the transmitting and receiving circuit, and a display device, e.g., liquid crystal display. A service program stored in a memory is accessible through a first code and a second code. The first code permits access to portions of the service program, and the second code permits access to fewer portions of the service program. The second code is generated based upon data associated with the telephone, e.g., a serial number and/or the first code. The service program is prevented from being accessed through the second code after the second code is used once. The portions of the service program that are accessible through the second code may be a subset of the portions of the service program that are accessible through the first code, and the portions of the service program that are accessible through the second code may include a routine for storing or setting the telephone number assigned to the apparatus.

30 Claims, 4 Drawing Sheets

APPARATUS AND METHOD FOR OPERATING A CELLULAR OR PORTABLE TELEPHONE

BACKGROUND OF THE INVENTION

This invention relates generally to an apparatus and a method for operating a cellular or portable telephone and, more particularly, to an apparatus and a method by which a user may activate a cellular or portable telephone without visiting a provider of cellular telephone services.

The use of cellular telephones has increased greatly in recent years. A cellular telephone needs to be activated before it can be employed to make and receive telephone calls. Cellular telephones are typically activated by an employee of the cellular telephone service provider, e.g., a service engineer, and activation generally takes place at one of the service provider's facilities or authorized cellular shop.

To activate the cellular telephone, an authorized individual, e.g., a service engineer, usually accesses a service program stored in the cellular telephone by entering an access code. Once the service program has been accessed, the service program presents various menus so that the authorized individual may change or input selected information, such as the telephone number assigned to the cellular telephone. A service program generally allows a number of variables or settings to be initialized or revised.

If the user does not purchase his or her cellular telephone directly from one of the service provider's facilities, the user is usually required take the cellular telephone to such a facility for activation. The user may be inconvenienced, perhaps greatly, by taking his or her cellular telephone to an authorized facility for activation.

Cellular telephones would be easier to use if they were capable of being activated by users, without the need for travel to authorized facilities for activation. Moreover, cellular telephones could be sold or distributed through more diverse channels of trade if they were capable of being activated by users. However, service providers are generally reluctant to disclose access codes for service programs since such programs, once accessed, permit whoever is viewing the various service programming menus to input or change a number of variables or settings. Only one of such variables or settings is the telephone number assigned to the cellular telephone. A user who accesses the service program through the access code could, for instance, inadvertently alter a desired parameter while attempting to activate the cellular telephone, which could result in an inoperative telephone.

One system for permitting a user to activate a cellular telephone utilizes a one-time code that is stored in a non-volatile memory in the cellular telephone. When the user enters the one-time code to set the telephone number assigned to the cellular telephone, the one-time code is replaced in the memory by an invalid value. Neither a user nor a service engineer may change the invalid value or reset the one-time code. If, for example, a cellular telephone has been returned to the service provider by one user, and the service provider desires to provide the cellular telephone to another user, the telephone would have to be sent back to the factory for resetting the one-time code so that the later user could activate the telephone.

Accordingly, a need exists for a cellular telephone that is easier to use and more convenient to activate. A need exists for a cellular telephone that can be activated by a user without the necessity for travel to an authorized facility for activation. A need exists for a cellular telephone that can be activated by a user, but that prevents the user from changing variables or settings other than the telephone number assigned to the cellular telephone. A need also exists for a cellular telephone that allows a service provider to reset a one-time code used for entering or programming the telephone number assigned to the cellular telephone.

OBJECTS OF THE INVENTION

An object of the invention is to overcome the problems and satisfy the needs previously considered.

Another object of the invention is to provide an apparatus and a method that permit a user to activate a cellular telephone, thus avoiding travel to a service provider's facility for activation.

Another object of the invention is to provide an apparatus and a method that permit a user to activate a cellular telephone but prevent the user from changing parameters other than the telephone number assigned to the cellular telephone.

A further object of the invention is to provide an apparatus and a method that make a cellular telephone easier to use, while reducing the risk that desired programming variables or settings will be altered by a user.

An additional object of the invention is to provide an apparatus and a method that allow a service provider to reset a one-time code used for entering or programming the telephone number assigned to the cellular telephone.

Other objects and advantages of the invention will be apparent to those having ordinary skill in the art based on the specification and drawings.

SUMMARY OF THE INVENTION

Generally speaking, a cellular or portable telephone according to the invention comprises means for transmitting and receiving signals, control means for controlling the transmitting and receiving means, and display means for displaying information. Such a telephone includes a memory for storing a service program. The service program is accessible through a first code which permits access to portions of the service program, and a second code which permits access to fewer portions of the service program. The second code is generated based upon data associated with the telephone, e.g., a serial number and/or the first code. Such a telephone also includes means for preventing the service program from being accessed through the second code after the second code is used once.

Preferably, the portions of the service program that are accessible through the second code are a subset of the portions of the service program that are accessible through the first code, and the portions of the service program that are accessible through the second code include a routine for storing or setting the telephone number assigned to the telephone. The memory advantageously includes storage locations for storing the telephone number assigned to the telephone, and the service program checks those storage locations to determine whether a dummy number is stored in them. If a dummy number is stored in those storage locations, as opposed to the actual telephone number for the telephone, the service program generates the second code and compares the second code to a code entered by a user. If the second code matches the user-entered code, the user is allowed to set the telephone number assigned to the telephone, e.g., by replacing the dummy number with the actual telephone number.

In one variation of the invention, the telephone number stored in the memory may be replaced with the dummy number when the service program is accessed by the first code, in essence, resetting the second code.

BRIEF DESCRIPTION OF THE DRAWINGS

For a more complete understanding of the invention, reference is made to the following description and the accompanying drawings, in which like reference numerals denote like elements or parts, and in which.

DETAILED DESCRIPTION

Figure 1:
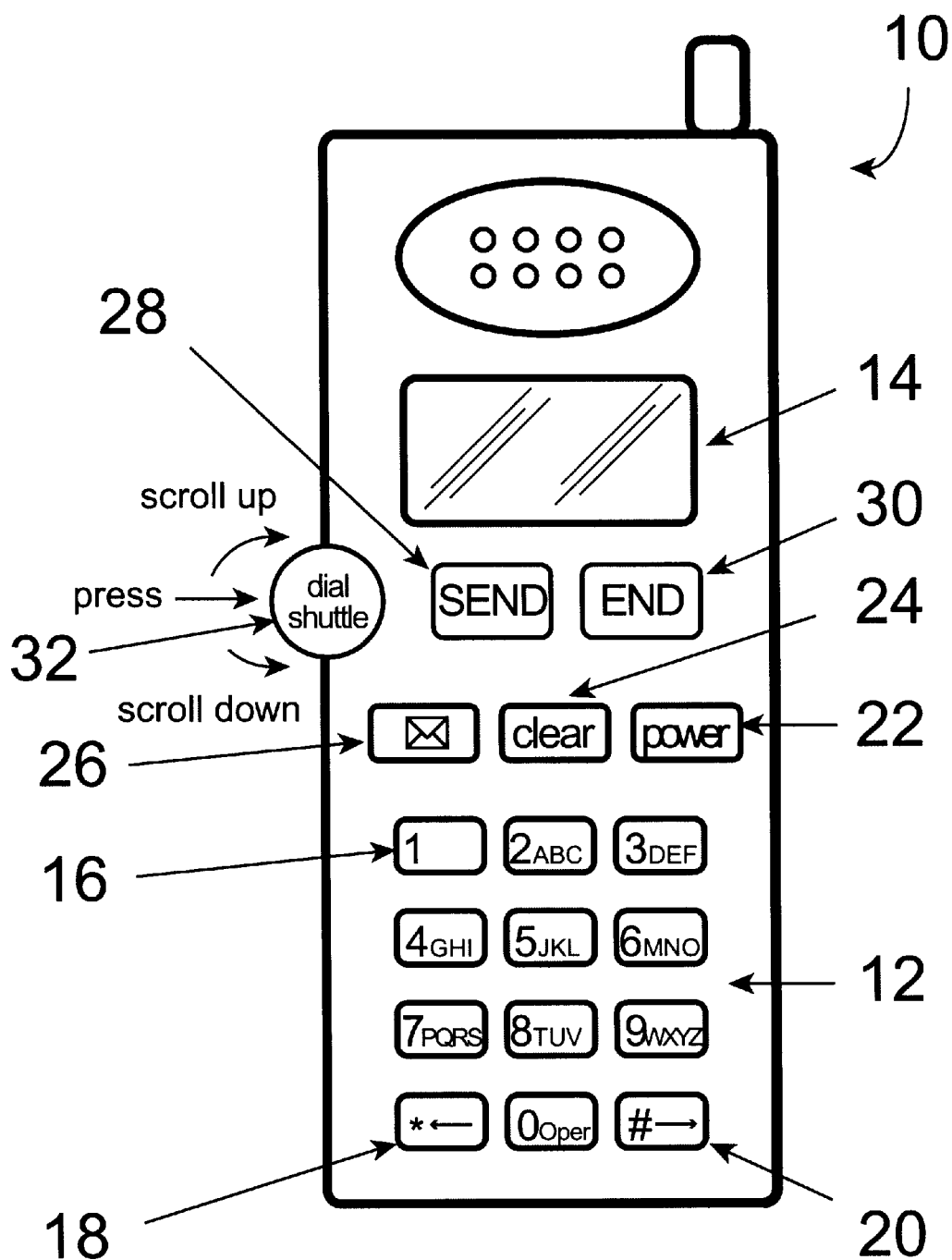
FIG. 1 is a plan view of a cellular telephone embodying the invention.

Referring now to the drawings, FIG. 1 illustrates a cellular telephone 10 having a keypad 12 and a display 14, which is preferably a liquid crystal display. The keypad 12 includes conventional numerical keys 16, a star or asterisk key 18, and a pound or number sign key 20. The keypad 12 contains a power key 22, a clear key 24, and a key 26 for accessing messages, which may be text messages or voice messages. The keypad 12 also contains a send key 28 as well as an end key 30.

The cellular telephone 10 has a dial shuttle or jog dial 32. The jog dial 32 may by rotated clockwise or counterclockwise to scroll up or scroll down through various listings on the display 14. The jog dial 32 may also be pressed under certain circumstances to select or enter appropriate data, for instance, in connection with menus displayed when the service program is accessed.

Figure 2:
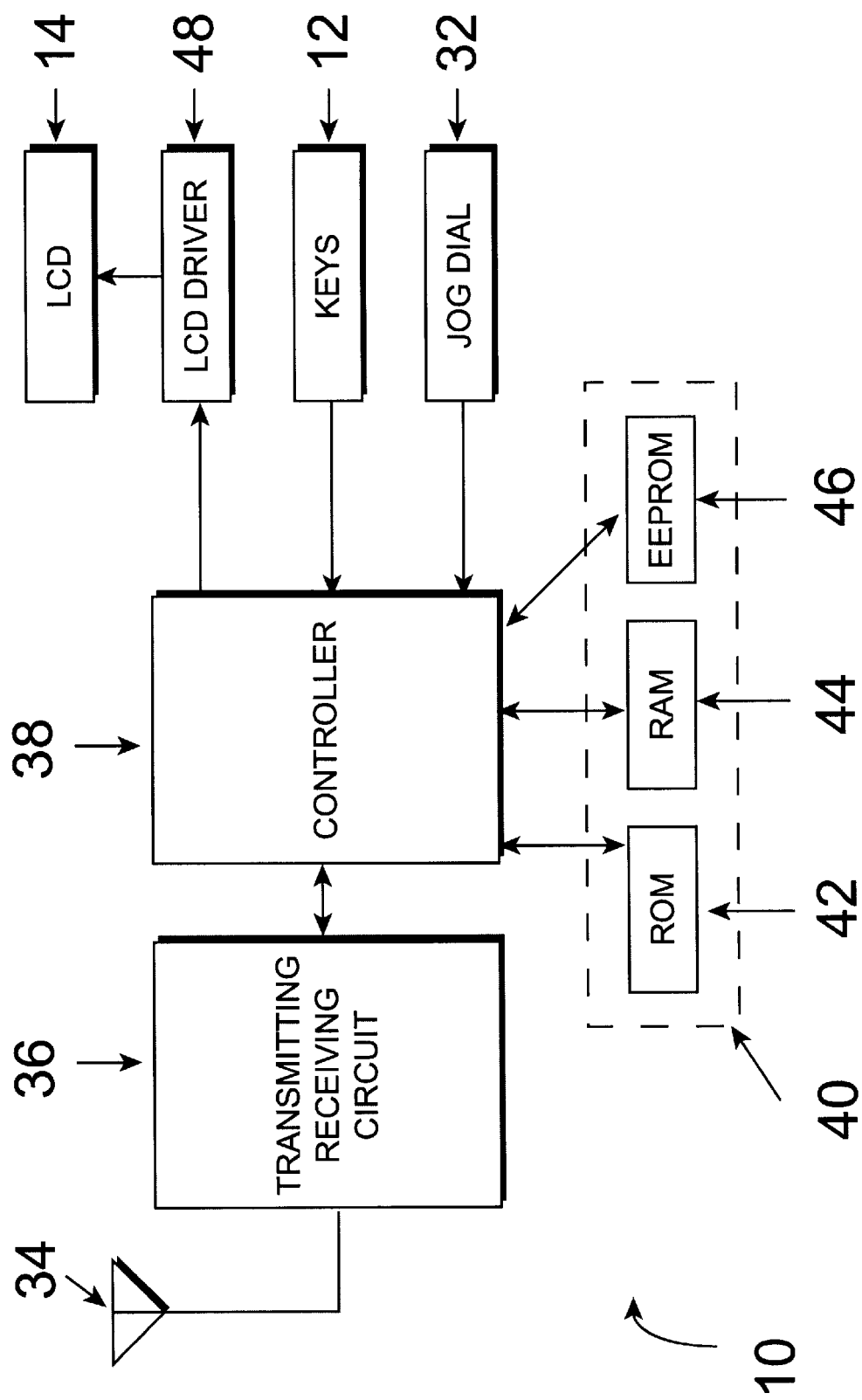
FIG. 2 is a block diagram of a cellular telephone embodying the invention.

As shown in FIG. 2, the cellular telephone has an antenna 34 for radiating and receiving electromagnetic signals. The antenna 34 is connected to a transmitting and receiving circuit 36, which processes the incoming and outgoing signals. Among other things, the transmitting and receiving circuit 36 generates a carrier signal, modulates the carrier signal with voice information, demodulates incoming signals, and produces sound.

The transmitting and receiving circuit 36 is connected to and controlled by a controller 38. The controller 38 is connected to a memory, denoted generally by the reference numeral 40. The memory 40 comprises a read-only memory (ROM) 42, a random-access memory (RAM) 44, and an electrical erasable programmable read-only memory (EEPROM) 46. The ROM 42 contains the programs for operating the cellular telephone 10. One of the programs stored in the ROM 42 is the service program. A service program typically allows an authorized individual to set or change parameters required for proper operation of the cellular telephone 10. A service program may, for instance, permit an authorized individual to designate the type of digital or analog telephone system, to specify the system identification, and to set the telephone number assigned to the cellular telephone. The EEPROM 46 stores data that can be set for the cellular telephone 10, e.g., the system identification and the assigned telephone number.

The controller 38 operates the liquid crystal display 14 through a driver circuit 48. The controller 38 causes various information to be displayed to the user, e.g., telephone numbers and text messages. The controller 38 also causes various menus to be displayed when the service program is accessed. The controller 38 receives inputs from the keypad 12 and the jog dial 32.

Figure 3A:
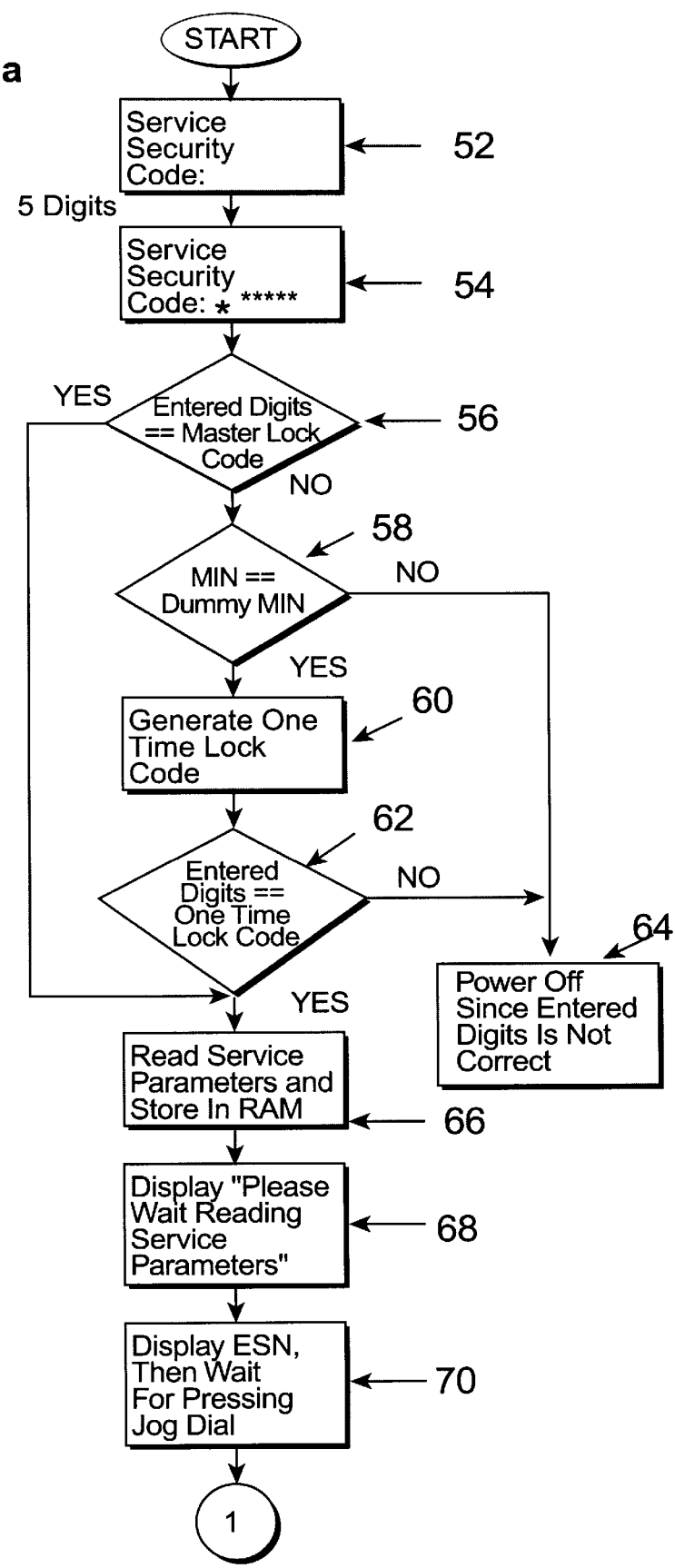
FIG. 3 is a flowchart of software for a cellular telephone embodying the invention.
Figure 3B:
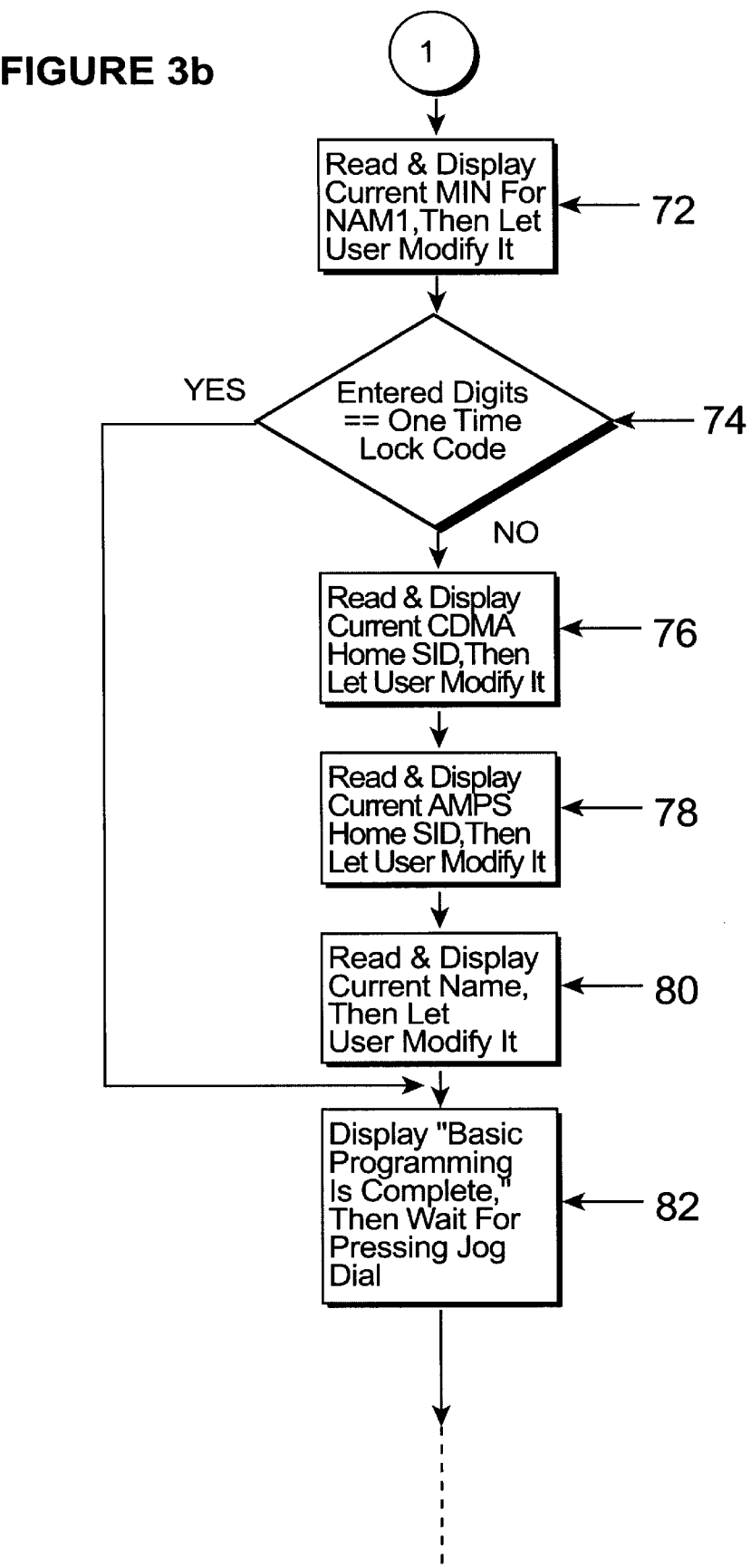

FIG. 3 generally depicts software 50 for a cellular telephone according to a preferred embodiment of the invention. When the appropriate keys are pressed to access the service program, the cellular telephone 10 displays "Service Security Code," as indicated by step 52. The service security code may be either a master lock code or a one-time lock code.

The cellular service provider would know the master lock code for its cellular telephones and would supply the master lock code to its service engineers. The service engineers would typically enter the master lock code to gain access to the service program.

By contrast, a user would in almost all cases not be aware of the master lock code. However, a user would contact the cellular service provider to obtain the one-time lock code. As discussed in greater detail below, the one-time lock code enables the user to gain access to the portion of the service program that permits the telephone number assigned to the cellular telephone to be set. Each cellular telephone has a unique electronic serial number (ESN), a unique master lock code, and a unique one-time lock code. The cellular service provider has a list or a table indicating which one-time lock codes and which master lock codes are associated with which electronic serial numbers.

In preparation for activating the telephone, the user contacts the cellular service provider and indicates the ESN for the telephone, typically found on the warranty card for the telephone. The service provider supplies the one-time lock code to the user and explains how to utilize the one-time lock code to set the telephone number and activate the telephone.

Referring again to FIG. 3, the "Service Security Code" displayed in connection with step 52 is a prompt for the entry of data, namely, the master lock code or the one-time lock code. When a six-digit code is entered, as indicated by the six asterisks in step 54, the routine proceeds to inquiry 56. Inquiry 56 checks whether the entered number matches the master lock code. If the entered number matches the master lock code, the routine branches to step 66. Step 66 causes the service parameters for the telephone to be read, i.e., to be read from the EEPROM 46 and stored in the RAM 44. In addition, the routine produces the display "Please Wait Reading Service Parameters," as denoted by step 68.

Referring back to inquiry 56, if the entered number does not match the master lock code, the routine 50 takes steps to determine whether the entered number matches the one-time lock code. In order to conserve the nonvolatile memory (EEPROM 46) and use it more efficiently, however, the one-time lock code is not stored in the nonvolatile memory (EEPROM 46). Instead, the one-time lock code is generated by the cellular telephone 10, as explained in greater detail below.

The routine 50 also takes steps to prevent the one-time lock code from being used more than once. Toward that end, a dummy telephone number is stored in the memory locations in the EEPROM 46 that will be used for storing the telephone number assigned to the cellular telephone 10. The manufacturer preferably stores the same dummy telephone number in all of the cellular telephones.

If the routine determines that the entered number does not match the master lock code, pursuant to inquiry 56, the routine ascertains whether the mobile identification number (MIN) matches the dummy number, as specified by inquiry 58. The mobile identification number (MIN) is a 34-bit binary number corresponding to the 10-digit directory telephone number assigned to the cellular telephone. Thus, the routine checks whether the dummy telephone number set by the manufacturer is stored in the EEPROM 46 or whether the dummy number has been changed.

If the dummy telephone number is contained in the EEPROM 46, the routine generates the one-time lock code, as noted by step 60. If the dummy telephone number is not contained in the EEPROM 46, the routine branches from inquiry 58 to step 64. Step 64 causes the power to be shut off. Accordingly, the cellular telephone 10 is shut off following entry step 54 if the master lock code is not entered and if the EEPROM 46 does not contain the dummy telephone number (indicating the telephone has been activated previously).

If, however, the master lock code is not entered but the EEPROM 46 contains the dummy telephone number, the routine generates the one-time lock code, as denoted by step 60. The one-time lock code and the master lock code preferably have the same number of digits, i.e., six digits in the example described herein. The six digits of the one-time lock code may be based upon the electronic serial number (ESN). For instance, the one-time lock code may be the six most significant digits of the ESN or the six least significant digits of the ESN or some other grouping or permutation. The six digits of the one-time lock code may be a function of the master lock code.

The routine preferably generates the one-time lock code based upon the ESN and the master lock code. For example, the one-time lock code may be a modulus or modulo function of the ESN and the master lock code.

After the routine generates the one-time lock code pursuant to step 60, the routine in inquiry 62 ascertains whether the one-time lock code it generated matches the number that was entered in response to the prompt for the service security code in step 52. If the one-time lock code generated by the routine does not match the entered number, the routine branches to step 64, which causes the power to be shut off. Consequently, the cellular telephone 10 is shut off following entry step 54 if the master lock code is not entered and if the appropriate one-time lock code is not entered (assuming the cellular telephone has not been activated by replacing the dummy telephone number with an actual telephone number).

If the routine in inquiry 62 determines that the one-time lock code it generated matches the number that was entered in response to the prompt for the service security code in step 52, the routine goes to step 66, which causes the service parameters for the telephone to be read. The routine then goes to step 68, which produces the display "Please Wait Reading Service Parameters," as discussed above.

One of the service parameters read pursuant to step 68 is the ESN. The routine displays the ESN at step 70. When the jog dial 32 is pressed, the routine moves to step 72. The routine reads and then displays the mobile identification number (MIN), as indicated at step 72. The MIN is displayed in the form of a 10-digit telephone number. If the program was accessed through the one-time lock code, the displayed MIN is the dummy telephone number.

When the MIN is displayed at step 72, whoever is operating the telephone, presumably a service engineer who accessed the program through the master lock code or a user who accessed the program through the one-time lock code, may change the MIN. The MIN is changed by entering another 10-digit telephone number through the keypad 12 and then by pressing the jog dial 32. The routine proceeds from step 72 to inquiry 74 when the jog dial 32 is pressed.

At inquiry 74, the routine ascertains whether the number entered in response to the prompt for the service security code in step 52 matches the one-time lock code. If the entered number matches the one-time lock code, the routine branches to step 82. Step 82 produces the display "Basic Programming Complete." This section of the program is exited by pressing the jog dial 32, as indicated by step 82.

If the routine determines in response to inquiry 74 that the number entered in response to the prompt for the service security code in step 52 does not match the one-time lock code, which indicates the number entered was the master lock code, the routine proceeds to other steps that allow various service parameters to be initialized or revised. As shown in FIG. 3, the routine proceeds from inquiry 74 to step 76. The routine reads and then displays the current code division multiple access (CDMA) and home system identification (Home SID) setting for modification, as indicated by step 76. If no change is desired, the jog dial 32 is pressed to move to the next step. If a change is desired, a new number is entered through the keypad 12 and then the jog dial 32 is pressed.

When the jog dial is pressed at step 76, the routine goes to step 78. The routine reads and then displays the current advanced mobile phone service (AMPS) and home system identification (Home SID) setting for modification, as indicated by step 78. If no change is desired, the jog dial 32 is pressed to move to the next step. If a change is desired, a new number is entered through the keypad 12 and then the jog dial 32 is pressed.

When the jog dial is pressed at step 78, the routine goes to step 80. The routine reads and then displays the current name for modification, as indicated by step 80. If no change is desired, the jog dial 32 is pressed to move to the next step. If a change is desired, a new name is entered through the keypad 12 and then the jog dial 32 is pressed.

When the jog dial is pressed at step 80, the routine goes to step 82. Step 82 produces the display "Basic Programming Complete." This section of the program is exited by pressing the jog dial 32, as denoted by step 82.

As indicated by the description above, the service program may be accessed through the master lock code or through the one-time lock code. If the service program is accessed through the one-time lock code, only the telephone number assigned to the cellular telephone or MIN may be modified in this embodiment of the invention. Other parameters may be modified, however, if the service program is accessed through the master lock code.

Once the service program is accessed through the one-time lock code and the dummy telephone number is replaced by an actual telephone number at step 72, the one-time lock code is essentially disabled. More specifically, if an actual telephone number is stored in the EEPROM 46, rather than the dummy telephone number, the inquiry 58 prevents the routine from proceeding to step 60, which generates the one-time lock code, and to step 70, which checks the one-time lock code against the entered number. If an actual telephone number is stored in the EEPROM 46, the routine causes the power to be shut off in accordance with step 64 upon determining that the entered number is not the master lock code.

As those having ordinary skill in the art will appreciate based upon the description above, the telephone number stored in the EEPROM 46 may be replaced by the dummy telephone number at step 72 when the service program is accessed through the master lock code. Thus, if an actual telephone number was stored in accordance with step 72 at one time, the service program could be entered at a later time through the master lock code. The actual telephone number could then be replaced by the dummy telephone number. The replacement of the actual telephone number by the dummy telephone number essentially resets the one-time lock code. Therefore, a cellular service provider who wishes to supply a used cellular telephone to another user does not have to send the telephone back to the factory to be reset. Instead, a service engineer would simply enter the service program through the master lock code and change the telephone number to the dummy telephone number.

The invention has been shown and described in conjunction with a preferred or exemplary embodiment and features thereof. The matter shown and described should be interpreted as illustrative, and not in a limiting sense. Those having ordinary skill in the art will recognize that various changes and modifications may be made in form, construction, and arrangement without departing from the spirit and scope of the invention, which is defined by the appended claims. The one-time lock code may be generated from the electronic serial number (ESN) alone. The one-time lock code may be generated from the master lock code alone. The one-time lock code may be reset through a mechanism different than the one discussed above. Furthermore, the dummy number may be a part of the mobile identification number (MIN). The dummy number may not be the same in every telephone. The dummy number may be derived by processing data in the telephone, for example, the ESN. Therefore, it is intended that the appended claims be interpreted as encompassing the embodiments disclosed herein, changes and modifications thereof, as well as equivalents thereto.

What is claimed:

1. A telephone, comprising:
   a display device;
   a keypad;
   a transmitting and receiving circuit;
   a controller for the transmitting and receiving circuit, the controller being connected to receive input signals from the keypad and to supply output signals to the display device;
   a memory for the controller, the memory containing a service program accessible selectably through a master lock code and a one-time lock code, the master lock code permitting access to selected portions of the service program and the one-time lock code usable only once to permit access to a subset of said selected portions of the service program;
   wherein a serial number is uniquely associated with said telephone and the one-time lock code is generated based upon the serial number and the master lock code.

2. The telephone of claim 1, wherein the service program permits the one-time lock code to be reset when the service program is accessed through the master lock code.

3. The telephone of claim 1, wherein the service program permits a telephone number for said telephone to be set when the service program is accessed through the one-time lock code.

4. The telephone of claim 1, wherein the subset of said selected portions of the service program accessible through the one-time lock code includes a routine for storing a telephone number for said telephone and the memory includes locations for storing the telephone number for said telephone.

5. The telephone of claim 4, wherein a dummy number is associated with said telephone and the service program checks the memory locations for storing the telephone number to determine whether the stored number matches the dummy number.

6. The telephone of claim 5, wherein the one-time lock code is generated and compared to a code entered by a user when the stored number matches the dummy number.

7. The telephone of claim 5, wherein the service program permits the one-time lock code to be reset by changing the telephone number stored in the memory locations to the dummy number.

8. An apparatus, comprising:
   means for transmitting and receiving signals;
   control means for controlling said transmitting and receiving means;
   display means for displaying information, said display means being connected to said control means;
   memory means for storing a service program, said memory means being connected to said control means, the service program being accessible through a first code and a second code, the first code permitting access to portions of the service program and the second code usable only once to permit access to fewer portions of the service program;
   means for generating the second code based upon numerical data associated with said apparatus; and
   means for preventing the service program from being accessed through the second code after the second code is used once.

9. The apparatus of claim 8, wherein the numerical data associated with said apparatus is a serial number.

10. The apparatus of claim 8, wherein the numerical data associated with said apparatus is the first code.

11. The apparatus of claim 8, wherein the means for generating the second code generates the second code based upon a serial number and the first code.

12. The apparatus of claim 8, wherein the numerical data associated with said apparatus is stored in said memory means.

13. The apparatus of claim 8, wherein the portions of the service program accessible through the second code are a subset of the portions of the service program accessible through the first code.

14. The apparatus of claim 8, wherein the portions of the service program accessible through the second code include a routine for storing a telephone number associated with said apparatus.

15. The apparatus of claim 8, further comprising means for permitting a telephone number for said apparatus to be set when the service program is accessed through the second code.

16. The apparatus of claim 15, wherein said memory means includes storage locations for storing the telephone number for said apparatus, wherein the service program checks said storage locations to determine whether a dummy number is stored in said storage locations, and wherein the service program generates the second code and compares the second code to a code entered by a user if the dummy number is stored in said storage locations.

17. The apparatus of claim 16, wherein the dummy number in said storage locations is replaceable with the telephone number for said apparatus.

18. The apparatus of claim 17, wherein the telephone number in said storage locations is replaceable with the dummy number when the service program is accessed through the first code, thereby effectively resetting the second code.

19. A method for operating a telephone having a memory containing a service program, said method comprising the steps of:

permitting portions of the service program to be accessed through a first code;

permitting fewer portions of the service program to be accessed through a second code which is usually only once;

generating the second code based upon numerical data associated with said telephone; and preventing the service program from being accessed through the second code after the second code is used once.

20. The method of claim 19, wherein the numerical data associated with said telephone is a serial number.

21. The method of claim 19, wherein the numerical data associated with said telephone is the first code.

22. The method of claim 19, wherein the step of generating the second code includes generating the second code based upon a serial number and the first code.

23. The method of claim 19, wherein the numerical data associated with said telephone is stored in said memory.

24. The method of claim 19, further comprising the step of allowing the second code to be reset when the service program is accessed through the first code.

25. The method of claim 19, wherein the portions of the service program accessible through the second code are a subset of the portions of the service program accessible through the first code.

26. The method of claim 19, wherein the portions of the service program accessible through the second code include a routine for storing a telephone number for said telephone.

27. The method of claim 19, further comprising the step of permitting a telephone number for said telephone to be set when the service program is accessed through the second code.

28. The method of claim 27, wherein said memory includes storage locations for storing the telephone number for said telephone, further comprising the steps of checking said storage locations to determine whether a dummy number is stored in said storage locations, generating the second code if the dummy number is stored in said storage locations, and comparing the second code to a code entered by a user if the dummy number is stored in said storage locations.

29. The method of claim 28, further comprising the step of permitting the dummy number in said storage locations to be replaced with the telephone number for said telephone.

30. The method of claim 29, further comprising the step of permitting the telephone number in said storage locations to be replaced with the dummy number when the service program is accessed through the first code, thereby effectively resetting the second code.

* * * * *